US012293776B2

(12) United States Patent
Lim et al.

(10) Patent No.: US 12,293,776 B2
(45) Date of Patent: May 6, 2025

(54) SYSTEM AND METHOD FOR STATEMENT ACQUISTION AND VERIFICATION PERTAINING TO AN INCIDENT

(71) Applicant: MOTOROLA SOLUTIONS, INC., Chicago, IL (US)

(72) Inventors: Bing Qin Lim, Bayan Lepas (MY); Steven D Tine, Cheshire, CT (US); Christian Ibarra, Weston, FL (US); Uvarajan Moorthy, Bedong (MY)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 330 days.

(21) Appl. No.: 17/935,939

(22) Filed: Sep. 28, 2022

(65) Prior Publication Data

US 2024/0105210 A1    Mar. 28, 2024

(51) Int. Cl.
| | | |
|---|---|---|
| *G10L 25/78* | (2013.01) |
| *G06F 40/289* | (2020.01) |
| *G06F 40/30* | (2020.01) |
| *G10L 15/26* | (2006.01) |

(52) U.S. Cl.
CPC ............ *G10L 25/78* (2013.01); *G06F 40/289* (2020.01); *G06F 40/30* (2020.01); *G10L 15/26* (2013.01)

(58) Field of Classification Search
None
See application file for complete search history.

(56) References Cited

U.S. PATENT DOCUMENTS

| 7,123,166 | B1 * | 10/2006 | Haynes | G08G 1/14 |
| | | | | 348/148 |
| 10,049,419 | B1 | 8/2018 | Marron et al. | |
| 10,298,875 | B2 | 5/2019 | Klein et al. | |
| 10,419,312 | B2 | 9/2019 | Alazraki et al. | |
| 10,714,079 | B2 | 7/2020 | Mariaskin et al. | |
| 10,824,922 | B1 * | 11/2020 | Tutar | G06V 30/19173 |

(Continued)

OTHER PUBLICATIONS

Wood, Colin. "Virginia Public Defenders Get Time-Saving Tool for Scanning Body Cam Videos." StateScoop, Jul. 12, 2022, statescoop.com/justicetext-virginia-public-defenders-body-cam-video/. Accessed Oct. 16, 2024. (Year: 2022).*

*Primary Examiner* — Hai Phan
*Assistant Examiner* — Jon Christopher Meis
(74) *Attorney, Agent, or Firm* — Barbara R Doutre

(57) ABSTRACT

A method and system are provided to facilitate statement acquisition and verification pertaining to an incident. One or more processors are operationally coupled to one or more software modules, configured to: receive audio data between a suspect and an officer at a portable radio, detect a pre-Miranda statement made by the suspect within the audio data; detect a Miranda warning made by the officer within the audio data; detect a waiving of Miranda rights by the suspect within the audio data; detect a post-Miranda statement by the suspect within the audio data after the waiving of Miranda rights; determine when a degree of semantic similarity between the pre-Miranda statement and the post-Miranda statement fails to satisfy an admissibility condition; generate one or more questions to induce the suspect to repeat the pre-Miranda statement; and present the one or more questions to an electronic user interface.

8 Claims, 5 Drawing Sheets

(56) References Cited

U.S. PATENT DOCUMENTS

| | | | | |
|---|---|---|---|---|
| 2013/0288219 | A1* | 10/2013 | Dheap | G09B 7/12 |
| | | | | 434/350 |
| 2018/0350354 | A1* | 12/2018 | Mariaskin | G10L 15/19 |
| 2019/0392537 | A1* | 12/2019 | Ferguson | H04M 1/72403 |
| 2021/0337307 | A1* | 10/2021 | Wexler | G06V 40/161 |

* cited by examiner

SYSTEM AND METHOD FOR STATEMENT ACQUISTION AND VERIFICATION PERTAINING TO AN INCIDENT

BACKGROUND

Portable radios, particularly those having audio and video capabilities, are increasingly being deployed to capture events taking place between an officer and a suspect associated with an incident. Additionally, police stations may be equipped with computer devices that may be used by officers when an individual is brought in for questioning.

One function that law enforcement officers may regularly perform is a statement gathering function (i.e., when questions are posed by voice to a suspect and as part of an interrogation). Questioning of a suspect may take place at the incident scene and/or at a police station. In the United States, if a suspect is arrested and the arresting officer intends to interrogate the prisoner immediately after the arrest, then a notification is provided advising the suspect of their right to remain silent (for example Miranda rights in the United States). Similar notifications are also provided in numerous other countries. The purpose of such notification is to preserve the admissibility of a suspect's statements made during custodial interrogation in later criminal proceedings.

If a suspect has waived his/her right to remain silent, then the officer will be seeking statements that are admissible in court. Even if the right to remain silent is waived, the questioning of a suspect can be challenging. For example, an officer may not be aware that a suspect made statements to non-officers (citizens) prior to officer arrival to the scene. Even upon an officer's arrival to the crime scene, there may have been statements uttered prior to Miranda readings, where such statements may be desirable to have repeated or expanded upon after a waiver of Miranda rights as suspects often change their statements pertaining to events that took place at an incident. Additionally, a change from incident scene location to a different interrogation location, such as a police interrogation room, and even a possible change in interrogating officers can make obtaining consistent statements from a suspect challenging.

Accordingly, it would be desirable to have a technical method and system to facilitate statement acquisition and verification pertaining to an incident.

BRIEF DESCRIPTION OF THE SEVERAL VIEWS OF THE DRAWINGS

In the accompanying figures similar or the same reference numerals may be repeated to indicate corresponding or analogous elements. These figures, together with the detailed description, below are incorporated in and form part of the specification and serve to further illustrate various embodiments of concepts that include the claimed invention, and to explain various principles and advantages of those embodiments.

Figure 1:
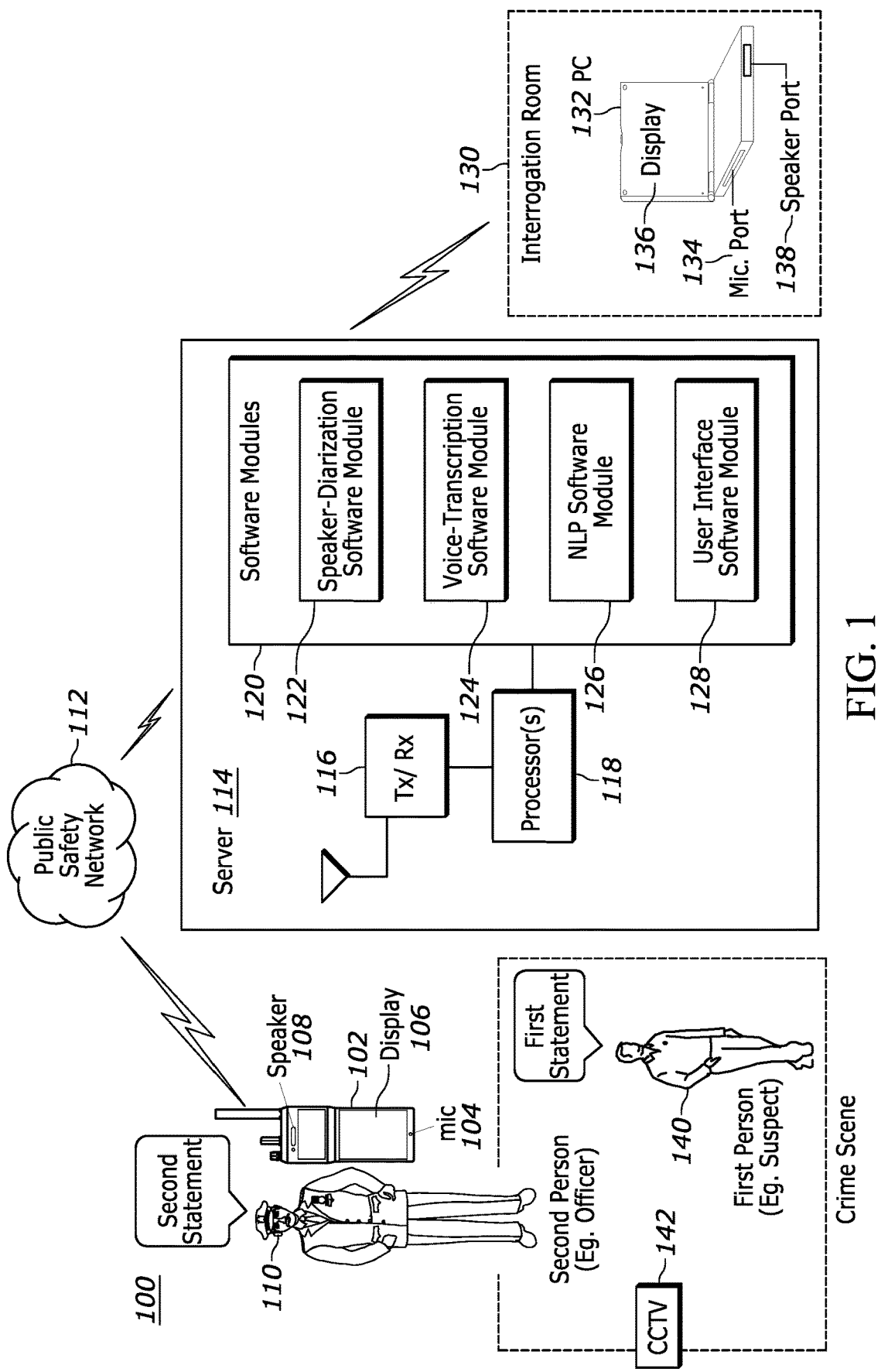
FIG. 1 is a block diagram of a communication system to facilitate statement acquisition and verification pertaining to an incident, in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The system, apparatus, and method components have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

DETAILED DESCRIPTION OF THE INVENTION

Briefly, there is disclosed herein a system and method for statement acquisition and verification pertaining to an incident.

In one embodiment a method to facilitate statement acquisition and verification pertaining to an incident includes: receiving audio data captured by one or more microphones, wherein the audio data comprises a first statement uttered by a suspect and a second statement uttered by a law enforcement officer; detecting, via a speaker-diarization software module executed by one or more processors upon the audio data, that the suspect uttered the first statement and the officer subsequently uttered the second statement. When additional remainder speech content is uttered by the suspect after the second statement uttered by the officer, then the method continues with generating, via a voice-transcription software module executed by the one or more processors upon the audio data, a transcription of the first statement, the second statement, and remainder speech content that was uttered by the suspect after the second statement was uttered by the officer; detecting, via a natural language processing (NLP) software module executed by the one or more processors upon the transcription, that the second statement comprises an explanation of a right to refrain from speaking that is codified into a body of law in at least one jurisdiction; detecting, via the NLP software module executed by the one or more processors upon the transcription, that a degree of semantic similarity between the first statement and the remainder speech content does not satisfy a predetermined admissibility condition; and presenting, via a user interface software module controlling an electronic display, an indication that the suspect did not repeat the first statement after the officer uttered the second statement. The method further continues with generating, via the NLP software module executed by the one or more processors upon the transcription, a question to induce the suspect to repeat the first statement; and presenting the question via the user interface software module, to an electronic user interface.

In a further embodiment, a communication system facilitates statement acquisition and verification during an interrogation relative to an incident includes: a portable radio having one or more processors, a transceiver and one or more microphones, wherein the portable radio receives audio data captured by the one or more microphones. The audio data comprises a first statement uttered by a suspect, a second statement uttered by an officer, and a remainder speech content uttered by the suspect after the second statement was uttered by the officer. The system further comprises a server communicatively coupled to the portable radio over a public safety network, the server comprising one or more processors configured to execute: detection, via a speaker-diarization software module, that the suspect uttered the first statement and the officer subsequently uttered the second statement. The server further provides transcription generation, via a voice-transcription software module, of the first statement, the second statement, and the remainder speech content that was uttered by the suspect after the second statement was uttered by the officer. The processors are further configured to execute detection, via a natural language processing (NLP) software module, that the second statement comprises an explanation of a right to refrain from speaking that is codified into a body of law in at least one jurisdiction. The server further provides detection, via the NLP software module, that a degree of semantic similarity between the first statement and the remainder speech content does not satisfy an admissibility condition. The server further provides for generation, via a user interface software module executed by the one or more processors, of an indication that the suspect did not repeat the first statement after the officer uttered the second statement; and generation, via the NLP software module executed by the one or more processors upon the transcription, of a question to induce the first speaker to repeat the first statement. The server further provides for transmission of the indication that the suspect did not repeat the first statement after the officer uttered the second statement, from the user interface software module, for presentation at a user interface of a public safety communication device; and further provides for transmission of the question, from the user interface software module, for presentation at the user interface of the public safety communication device.

Example embodiments are herein described with reference to flowchart illustrations and/or block diagrams of methods and system according to example embodiments. It will be understood that each block of the flowchart illustrations and/or block diagrams, and combinations of blocks in the flowchart illustrations and/or block diagrams, can be implemented by computer program instructions. The methods and processes set forth herein need not, in some embodiments, be performed in the exact sequence as shown and likewise various blocks may be performed in parallel rather than in sequence. The computer program instructions may also be stored in a computer-readable memory of a server that can direct a portable communication device, such as a portable radio or portable computer, to function in a particular manner, such that the instructions stored in the computer-readable memory produce an article of manufacture including instructions which implement the function/act specified in the flowchart and/or block diagram block or blocks. The server including the computer program instructions may be on or off-premises, or may be accessed via the cloud FIG. 1 is a block diagram of a communication system 100 to facilitate statement acquisition and verification pertaining to a crime incident, in accordance with some embodiments. The communication system 100 includes a portable public safety communication device, shown as portable radio 102, having audio and video recording capability. The portable radio 102 includes user interface elements, such as one or more microphone(s) 104, speaker 108 and electronic display 106. The electronic display 106 provides display with touch interface capabilities. The portable radio 102 operates under the control of a law enforcement officer 110 and communicates over a public safety network 112 with a public safety server 114. The portable radio 102 is being operated at the incident location.

The portable radio 102 is preferably a converged device that provides both narrowband and broadband communications. For example, narrowband communications may operate using LMR radio protocols while broadband communication may operate using Long Term Evolution (LTE) protocols including cellular and multimedia capabilities. The portable radio 102 includes transceiver(s), processors, and audio processing capabilities (not shown) which support a converged communication device. While mission critical communications are handled using the narrowband communications, such as push-to-talk (PTT) and emergency, the audio and video capture are handled using the broadband communications.

The server 114 includes a transceiver 116 and one or more processors 118 which control a plurality of software modules 120. For the purposes of this application, the software modules of interest include a speaker-diarization software module 122 (which differentiates audio between different speakers), a voice-transcription software module 124 (for transcribing audio to text), a natural language processing (NLP) software module 126 (for analyzing transcription content from different speakers for similarities), and a user interface software module 128 (for generating indicators for transmission to remote user interface(s) of other devices).

The communication system 100 may further include a second portable communication device, such as a portable computer 132, which is a public safety computer device communicatively coupled to the server 114. For the purposes of this application, the portable computer 132 is located away from the incident, such as in an interrogation room 130 of a police station or other government location. The portable computer 132 also includes user interface elements including a microphone port 134, an electronic display 136, and speaker port 138 (for connection to an earpiece if desired).

While shown embodied in the server 114, one or more of the plurality of software modules 120 may reside within the portable radio 102 and/or the portable computer device 132 depending on the processing capabilities of those devices.

In accordance with the embodiments, the communication system 100 captures statements from a suspect 140 made prior to being taken into custody and read their legal rights, including the right to remain silent. In some embodiments, the communication system 100 may further capture, via remote sources, statements made by the suspect 140 to non-law enforcement personnel. Such statements may have been captured, for example, by closed caption circuit television (CCTV) equipment 142 having audio and video capability, where the CCTV device is communicatively coupled to, or accessible by, the server 114 over the public safety network 112.

As will be described in further detail throughout the application, based on the statements captured by the portable radio 102, the communication system 100, via server 114, can detect that: initial statements have been made by the suspect 140, that legal rights have been read to the suspect by the officer and waived by the suspect, and that additional speech content has been uttered by the suspect after the waiver. The communication system 100, via server 114, subsequently analyzes the statements made by the suspect, if any, after the rights have been waived for comparison to the initial statements.

Initial statements include those spoken to the officer and captured by the portable radio 102. Initial statements may further include those captured by remote devices, such as CCTV equipment 142. If the initial and subsequent statements are not sufficiently similar, the server 114 generates, via NLP software module 126, and transmits, via transceiver 116, an indication of the dissimilarity for presentation at the display 106 of the portable radio 102. If the statements are not sufficiently similar, the server 114 further generates, via NLP software module 126, and transmits, via transceiver 116, one or more questions for presentation at the display 106 of the portable radio 102. The questions are generated based on the initial statement content and the expected answer. The one or more questions are presented for the officer to ask the suspect so that the suspect will verbally repeat those initial statements again after the right to remain silent has been waived. The NLP software module 126 may be configured to generate a predetermined number of additional questions and process responses to the additional questions to determine a degree of semantic similarity between the first statement and each response until the condition is satisfied.

Audio playback options of the statements recorded by the portable radio 102 are also made available via the user interface display 106 for playback at speaker 108. The user interface display 106 may further provide color coding or highlighting over portions of displayed audio transcriptions to indicate the strength of statement similarity between initial statements and subsequent statements. The user interface display 106 may further provide checkbox indicators to indicate that initial statements and post-waiver statements are sufficiently matched to satisfy an admissibility condition. The manner in which audio playback options, color coding or highlighting, and checkbox indicators and other user interface attributes may all be managed by server 114 for access by the portable radio 102 and, if applicable, computer device 132.

In the United States, a Miranda warning is a type of notification customarily given by police to criminal suspects in police custody (or in a custodial interrogation) advising them of their right to silence and, in effect, protection from self-incrimination; that is, their right to refuse to answer questions or provide information to law enforcement or other officials. These rights are often referred to as Miranda rights. Similar rights exist in numerous other countries. In standard police procedure, officers may not interrogate a suspect who is in custody unless he has waived his Miranda rights. A waiver is valid if it was: (1) knowing, (2) intelligent, (3) voluntary, (4) express or implied, (5) timely, and (6) not the product of impermissible pre-waiver tactics. Once someone detained by the police invokes their Miranda rights by expressing a desire to remain silent, have counsel present, or both, the police must stop the interrogation. The purpose of a Miranda type notification is to preserve the admissibility of the suspect's statements for later criminal proceedings. The admissibility condition utilized by communication system 100 is based on providing sufficient similarity between a pre-Mirada statement and a post-Miranda statement that was made post-waiver so as to be admissible in court.

In general, every crime involves three elements: first, the act or conduct ("actus reus"); second, the individual's mental state at the time of the act ("mens rea"); and third, the causation between the act and the effect (typically either "proximate causation" or "but-for causation"). For example, murder is a crime that has the elements of criminal act, criminal intent, causation, and harm. As another example, the main elements necessary to prove arson are the act of starting a fire, the intent to start the fire, and damage to property caused by the fire. As another example, an assault with a deadly weapon occurs when an attacker accompanies a physical attack with a physical object capable of inflicting serious bodily injury or death, by virtue of its design or construction. Different types of crime have their own elements associated therewith. In accordance with the embodiments, the communication system 100 is directed to obtaining statements that support elements associated with the incident crime that can be used during a criminal proceeding. Pre-Miranda statements are the statements spoken by suspect before the Miranda right was provided to the suspect, and the post-Miranda statements are the statements spoken by suspect after both the reading of Miranda and after waiver by the suspect. While post-Miranda statements which are volunteered by a suspect without waiver may be used in a court of law, and can be used for comparison to pre-Miranda statement, however the ability to interrogate the suspect in custody should be avoided or limited unless the right to remain silent has been waived. The pre-Miranda, initial statements made by a suspect may include important incriminating statements that support the elements of a crime and are thus highly desirable to have repeated to meet the admissibility condition. The generated questions are aimed at having those statements repeated and may further be direct at obtaining additional information pertaining to the elements of the current crime.

The server 114 detects, via the NLP software module 126 executed by the one or more processors 118 upon the transcription, whether a degree of semantic similarity between the first statement and the remainder speech content satisfies (or does not satisfy) the admissibility condition. If sufficient semantic similarity is not determined between pre and post-Miranda statements, then the processor(s) 118 are configured to generate a question to induce the suspect to repeat the pre-Miranda statement. For example, if a pre-Miranda statement included statements such as "I went to her house to stab her", "I shot him", "I killed my father" (statement pertaining to a criminal act) and the post Miranda statements differ, for example "I don't know what happened", "he was cheating on me", then questions are generated to help induce the restatement of the pre-Miranda incriminating statement(s). The questions are generated by the NLP software module 126 executed by the one or more processors 118 based on the transcription and provided to the user interface software module 128 for presentation at the portable radio 102 (located at the incident scene) or the computer 132 (in an interrogation room). The question is presented via a user interface of the portable radio 102 (e.g. in-ear speaker operatively coupled to the portable radio or display 106) and may further be provided to the electronic display 136 of the computer 132. The processor is configured for generation of one or more questions to induce the suspect to repeat the initial incriminating statement; and presentation of the question(s) via the user interface of the receiving device (radio or computer).

For example, if CCTV 142 device captures a statement between the suspect and a neighbor prior to arrival of the officer to the scene (e.g. "Sam owed me a hundred thousand dollars", then this statement can be processed via communication system 100 as previously described, and forwarded for display at the officer's communication device. If the suspect's statement is not subsequently repeated in a post-Miranda/post-waiver statement, then one or more question(s) may be generated by the NLP software module 126 and sent over the system 100 for display at the officer's device to induce a repeat of the statement or a similar statement. For example, a generated question such as "Did Sam owe you money?", "How much money did Sam owe you" could be generated and displayed.

In accordance with the embodiments, the computer device 132 may also be used to capture post-Miranda statements in a similar manner to the portable radio 102. Statements made in an interrogation room will be captured by the computer's microphone(s) and compared to initial statements and previous responses to questions. Statements captured by the computer 132 are provided to the server 114 for transcription by voice transcription software module 124 and comparison via NLP software module 126. If the initial and subsequent statements acquired in the interrogation room are not sufficiently similar, the server 114 generates and transmit an indication of the dissimilarity for presentation at the display 136 of computer 132. If the statements are not sufficiently similar, the server 114 further generates, via the NLP software module 126, additional questions and transmits, via user interface software module 128 the one or more questions for presentation at the display 136 of the computer device 132. Audio playback options of the statements recorded by the portable radio 102 and computer 132 are also made available via the computer's user interface display 136. The user interface display 136 may further provide color coding or highlighting over portions of displayed audio transcriptions to indicate the strength of statement similarity. The user interface display 136 may further provide checkbox indicators to indicate that initial statements and post-waiver statements are sufficiently matched to satisfy an admissibility condition. Hence, an interrogation that begins at the incident scene with one officer can be seamlessly transferred to a different location and managed by another officer using computer device 132.

Figure 2:
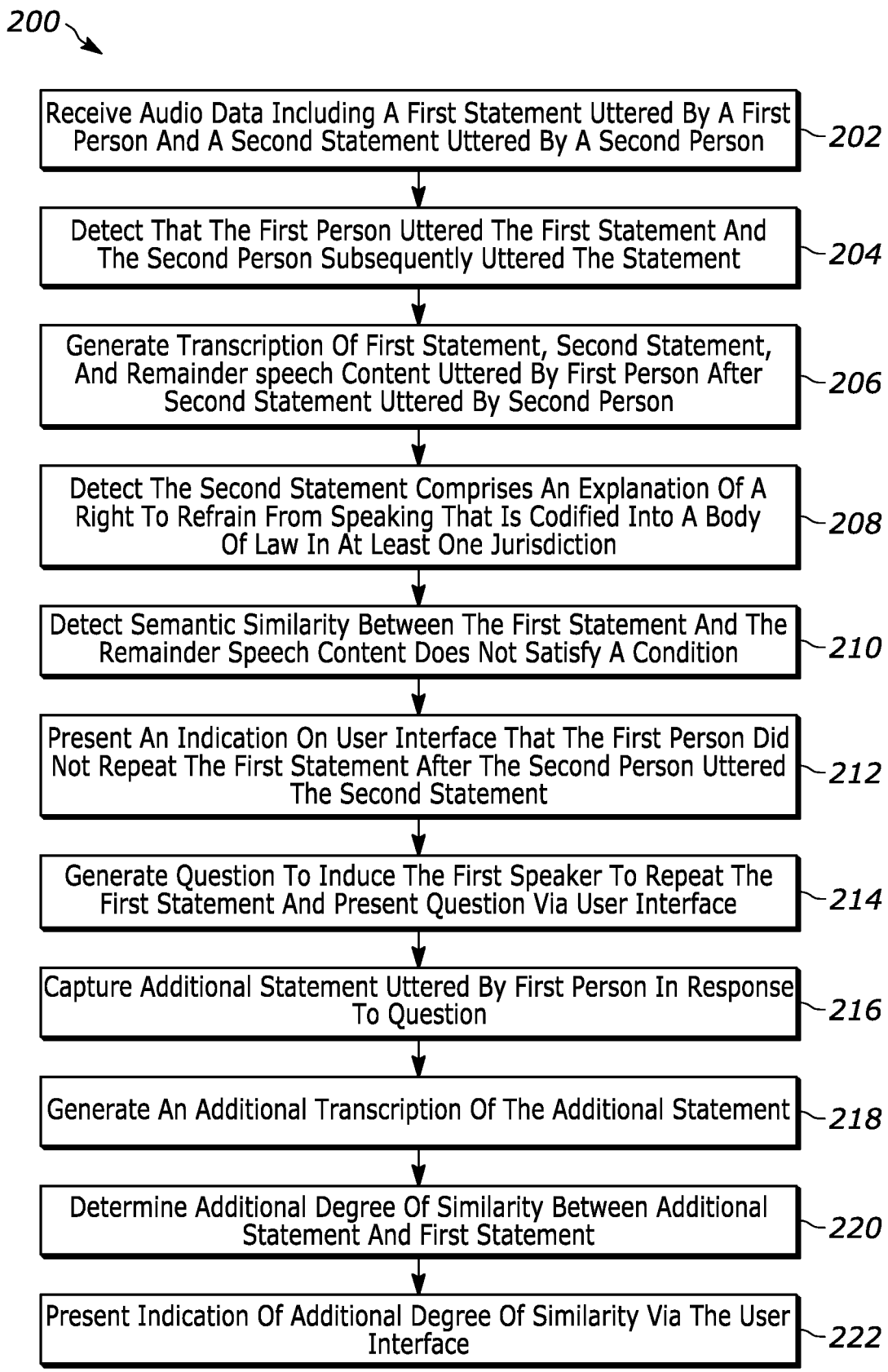
FIG. 2 is a flowchart for a method to facilitate statement acquisition and verification pertaining to an incident in accordance with some embodiments.

FIG. 2 is a method 200 for operation of the communication system of FIG. 1 in accordance with some embodiments. The method begins at 202 with receiving audio data captured by one or more microphones, wherein the audio data comprises a first statement uttered by a first person (e.g. a suspect) and a second statement uttered by a second person (e.g. officer). The microphones may be located, for example, at the officer's device, and may further include microphones located at remote devices, such as CCTV devices, near the incident.

The method then continues at 204 with detecting, via a speaker-diarization software module executed by one or more processors upon the audio data, that the first person uttered the first statement and the second person subsequently uttered the second statement. The method continues at 206 with generating, via a voice-transcription software module executed by the one or more processors upon the audio data, a transcription of the first statement, the second statement, and remainder speech content that was uttered by the first person after the second statement was uttered by the second person.

In accordance with the embodiments the method continues at 208 with detecting, via the NLP software module executed by the one or more processors upon the transcription, that the second statement comprises an explanation of a right to refrain from speaking that is codified into a body of law in at least one jurisdiction (e.g. Miranda warning or other jurisdictional warning), and then detecting at 210, via the NLP software module executed by the one or more processors upon the transcription, that a degree of semantic similarity between the first statement and the remainder speech content does not satisfy a condition.

The method continues at 212 by generating, via a user interface software module, an indication that the first person did not repeat the first statement after the second person uttered the second statement. The method provides for transmission of the indication that the suspect did not repeat the first statement after the officer uttered the second statement, via the user interface software module, for presentation at a user interface of a public safety communication device.

In accordance with further embodiments, the method further continues at 214 with generating, via the NLP software module executed by the one or more processors upon the transcription, a question to induce the first person to repeat the first statement, and module. The method provides for transmission of the question, via the user interface software module, for presentation at the user interface of the public safety communication device.

Additional statements in response to the question may be captured at 216, additional transcriptions generated based on the additional statements at 218. The method may continue at 220 to determine any additional degree of semantic similarity between the additional statements(s) and initial (incriminating) statements. Indications of the additional degree of semantic similarity may be generated at 222 by the user interface software module, for transmission to a user interface of the public safety communication device.

The method may further generate a list of transcribed statements made by the first person prior to the second statement for display at a user interface. The method may further include providing a list of questions, generated by the NLP software module, that were generated to prompt a re-statement of at least one of the statements from the list of statements. The method may further include providing a user interface playback option, to a user interface display, to selectively play back audio associated with the list of statements.

Figure 3:
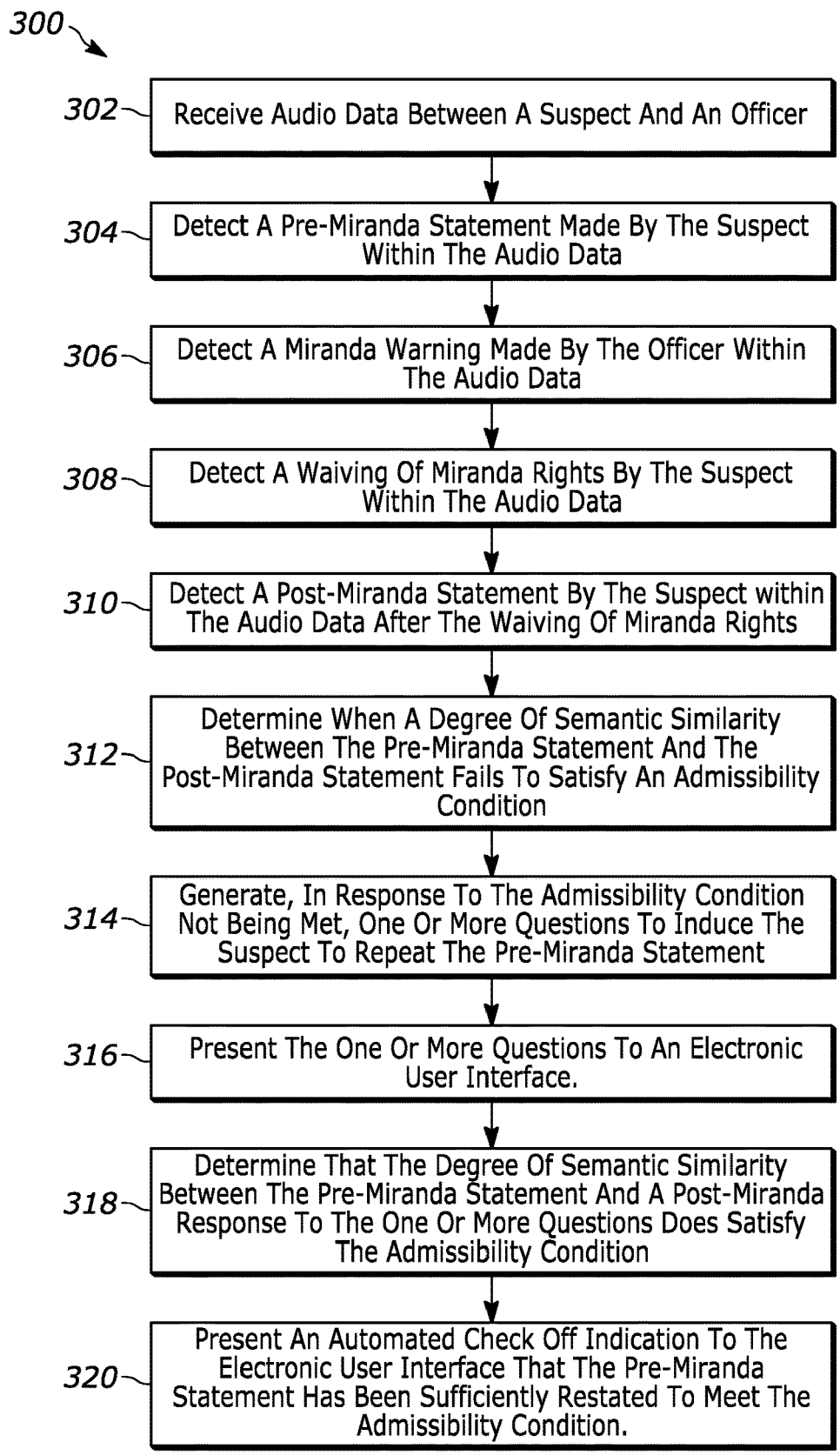
FIG. 3 is an example method in accordance with some embodiments.

FIG. 3 is an example method 300 for operation of the communication system of FIG. 1 in accordance with some embodiments. This method 300 provides a US-centric example of the method 200 of FIG. 2 using the system of FIG. 1. In this example, the one or more processors operationally coupled to one or more software modules of FIG. 1 are configured to: receive audio data between a suspect and an officer 302; detect a pre-Miranda statement made by the suspect within the audio data 304; AND detect a Miranda warning made by the officer within the audio data 306. In accordance with the example embodiment, the method continues at 308 to detect a waiving of Miranda rights by the suspect within the audio data; and detect a post-Miranda statement by the suspect within the audio data after the waiving of Miranda rights at 310. The method continues at 312 determine when a degree of semantic similarity between the pre-Miranda statement and the post-Miranda statement fails to satisfy an admissibility condition; generate, in response to the admissibility condition not being met, one or more questions to induce the suspect to repeat the pre-Miranda statement at 314; and present the one or more questions to an electronic user interface at 316.

In accordance with some embodiments, subsequent to the generation and presentation of the one or more questions, the one or more processors operationally coupled to one or more software modules of FIG. 1, may be further configured to: determine that the degree of semantic similarity between the pre-Miranda statement and a post-Miranda response to the one or more questions does satisfy the admissibility condition at 318; and present an automated check off indication to the electronic user interface that the pre-Miranda statement has been sufficiently restated to meet the admissibility condition at 320.

The electronic user interface for presentation of the one or more indicators and questions may include the electronic display 106 of the portable radio 102 of FIG. 1; and/or an electronic user interface of the remote law enforcement computer 132, such as the display 136. Examples of the user interfaces for the portable radio 102, are similar to the computer device 132, and will be further described in conjunction with FIGS. 4 and 5.

Figure 4:
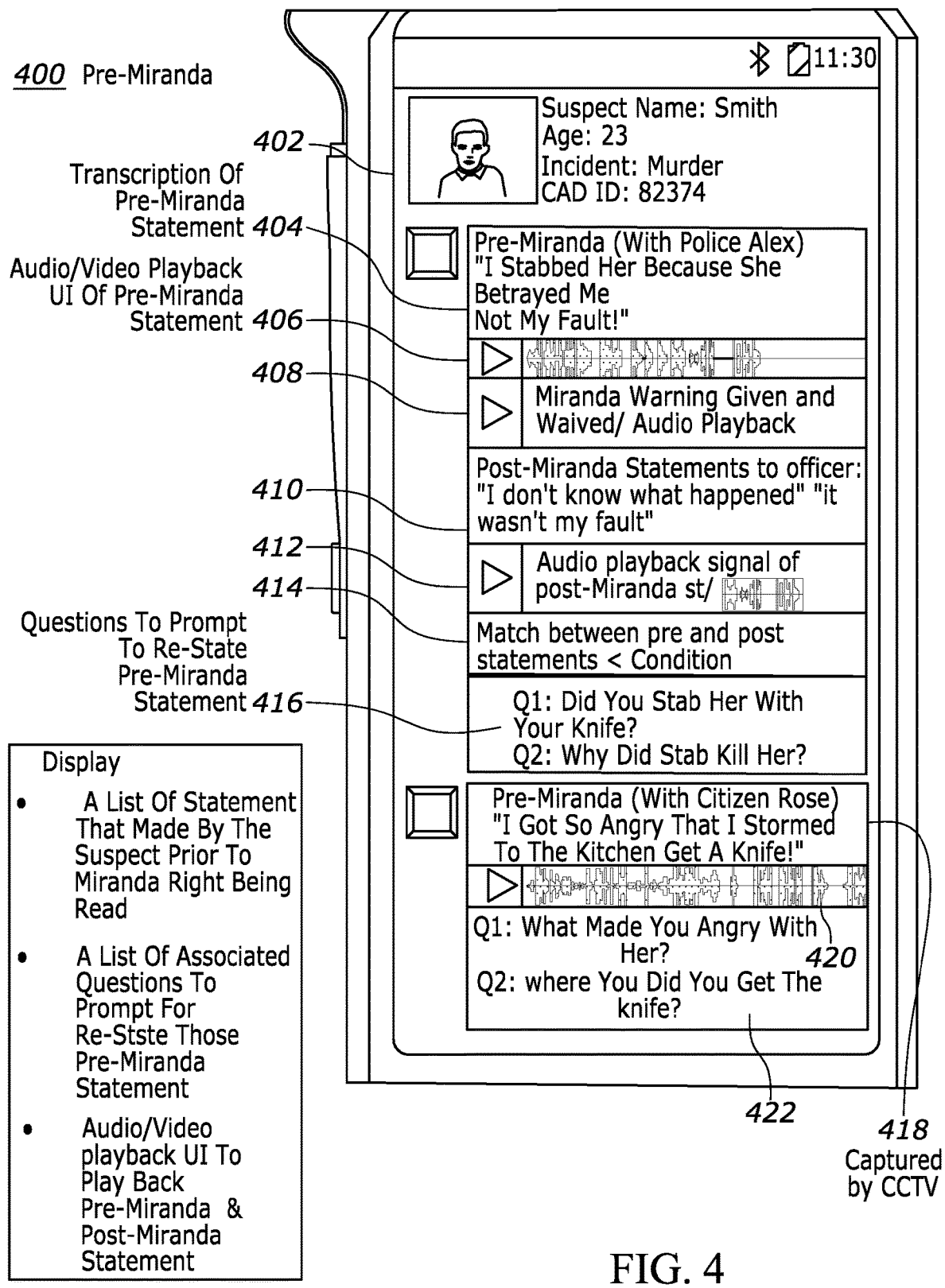
FIG. 4 illustrates an example of a first user interface for pre-Miranda and post-Miranda statement collection with question generation, in accordance with some embodiments.

FIG. 4 illustrates an example of a first user interface for pre-Miranda and post-Miranda statement collection with question generation, in accordance with some embodiments. An example user interface 402 may include an electronic display having a touch interface such as that described in conjunction with the portable radio 102 of FIG. 1, used by a first officer at the incident. Alternatively, the user interface 402 may be displayed at a computer device, such as computer device 132 of FIG. 1, being operated by a different police officer, when the suspect has been transferred to an interrogation room.

At 404, a transcription of a pre-Miranda statement is shown in text with audio playback option at 406. Confirmation of Miranda warning being given and waived is displayed at 408, including an audio playback option to replay those statements. A transcription of post-Miranda statements is provided as text at 410 with audio playback option at 412. Hence, a transcription of first statement(s) (pre-Miranda), second statements (Miranda warning), and remainder speech content (waiver and post Miranda statements) have been made available to the officer via text and audio playback.

For example, during a suspect interrogation, the officer can mark, using a user interface of portable radio or computer, a suspect as interviewee (such as by entering the suspect's name, or checkmark on a photo or camera field of view to recognize the face of the suspect through face recognition in order to determine who is the interviewee in the current case). If the interrogation is carried out in an interview room, an interview room camera, similar to CCTV 142, in communication with the server 114 and computer 132 can be used to auto determine the suspect using face recognition. A suspect's audio samples can be captured to generate a voiceprint (voice signature) of the suspect so as to determine the pre-Miranda and post-Miranda statements of the suspect (such as by determining a voiceprint match between the suspect voiceprint and the audio captured by a microphone.

At 414, an indication is displayed that a degree of semantic similarity between the first statement made by the suspect and the remainder speech content made by the suspect does not satisfy an admissibility condition. An image of the suspect may be displayed in conjunction with a list of statements. As described previously, providing such an indication is based on processing of the transcriptions using NLP software. As a result of not meeting the admissibility condition at 414, one or more questions are generated and displayed at 416, where such questions are generated to induce or prompt the suspect to repeat the first statement. The questions may be stated to the suspect by either the first officer (in the field) or by a different officer operating the computer device 132 at the interrogation room 130.

Additional statements by the suspect may also be captured by remote sources in the field during the incident or after the incident prior to statements being made to the police officer, such as audio captured by CCTV cameras. Audio data obtained from CCTV cameras may be processed, by the server of FIG. 1, and forwarded to officer's device. At 418 a transcription of a statement made by the suspect to a private citizen is displayed, along with an audio playback option at 420. These additional captured statements allow for the generation of additional questions, which again can be used to induce the suspect to make restatements. As previously described, the questions can be generated via an NLP software module executed by one or more processors upon the transcription, until a degree of semantic similarity between pre-Miranda statements and post-Miranda responses to questions satisfy a degree of semantic similarity to satisfy an admissibility condition.

Figure 5:
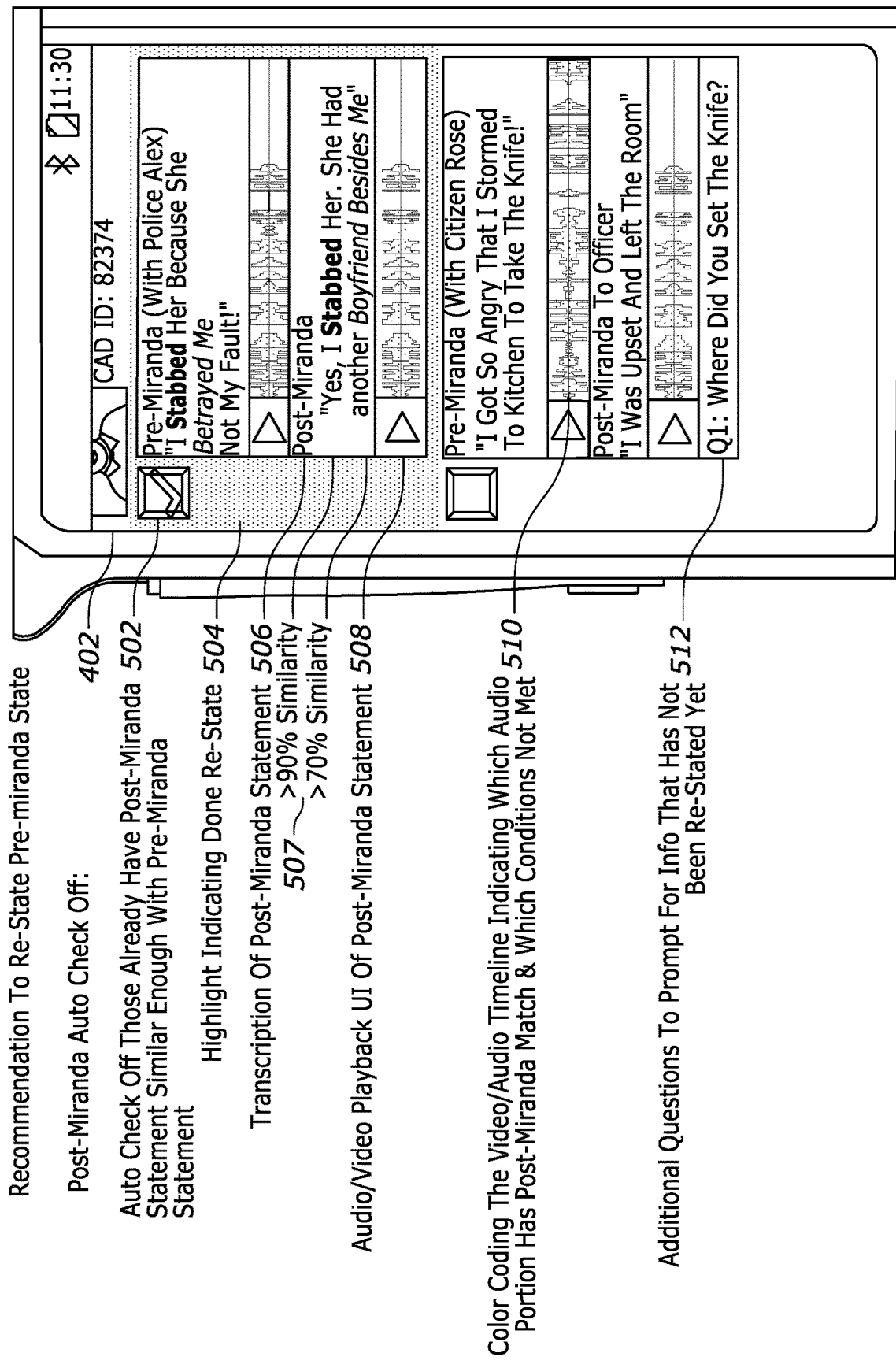
FIG. 5 illustrates an example of a second user interface for pre-Miranda and post-Miranda statement verification with additional question generation in accordance with some embodiments.

FIG. 5 illustrates an example of a second user interface for pre-Miranda and post-Miranda statement verification with additional question generation in accordance with some embodiments. In this embodiment, the electronic display 402 provides a user interface checkbox to acknowledge that a portion of text of the first statement does not meet the predetermined semantic similarity threshold with at least of the remainder speech content and/or the response to the one or more questions. At 502 an auto-generated checkmark indicates the restatement transcription is sufficiently similar to the pre-Miranda statement transcription. For example, an admission of 'stabbing' that occurs in pre and post statements would provide a very high percentage similarity and result in an automated checkmark. Alternatively, highlighting of the portions of the transcriptions that are a high match can be provided 504, requiring that the user touch the checkbox to acknowledge that the admissibility condition has been met for the element of causation. A statement of 'betrayal' and 'having another boyfriend' would have a lower percentage of similarity. This lower similarity can still provide a basis for question generation pertaining to establishing the element of motive for the stabbing, motive being another admissibility condition for murder. Additional questions can be generated by the NLP module directed towards establishing the suspect's motive.

Different color coding can be used to distinguish between high similarity statements (no questions need be generated) and lower similarity statements for which additional questions are generated, as indicated for example at 507. For example, a 90 percent similarity might be color coded in green, and a seventy percent similarity might be color coded in orange. Different text format can also be used such as bold text for a strong match and italic text for a lesser match, as well as different highlight colors or patterns. The example of FIG. 5 shows bold font being used for a strong match of "Stabbed" in both pre and post Miranda statement, and further support the element of causation. The text of "betrayed me" in the pre-Miranda statement and "boyfriend besides me" in the post Miranda statement might be in italics as not being strong match but potentially related and support the element of motive. Hence, additional questions as to motive may be based on these statements, even though mismatched Audio playback options (and video if available) are provided, such as at 508.

Statements captured via remote sources, such as CCTV cameras, can similarly be color coded to indicate matching strength level of portions of pre and post Miranda statements 510. The color coding can be applied to the text, and also to the video and audio playback timeline. For example, a first portion of an audio timeline may be color coded as green indicating a strong match between a post-Miranda statement with a pre-Miranda statement, while a second portion of the audio timeline may be color coded as orange indicating a lack of match between the post-Miranda statement and the pre-Miranda statement. The color coding can be applied to both pre-Miranda audio timeline and post-Miranda audio timeline, providing a cross-reference between the timelines that indicates sufficient similarity or insufficient similarity. Additional questions to prompt a closer restatement of a pre-Miranda utterance may also be generated and displayed 512.

Hence, the user interface provided by FIG. 5 may beneficially provide for a list of transcribed responses to processor generated questions; an indication of semantic similarity, such as confidence percentage level, between the first statement and each response, and display additional questions when the semantic similarity confidence level has not reached a predetermined desired confidence level.

As should be apparent from this detailed description above, the operations and functions of the electronic computing device are sufficiently complex as to require their implementation on a computer system, and cannot be performed, as a practical matter, in the human mind. Electronic computing devices such as set forth herein are understood as requiring and providing speed and accuracy and complexity management that are not obtainable by human mental steps, in addition to the inherently digital nature of such operations (e.g., a human mind cannot interface directly with RAM or other digital storage, cannot transmit or receive electronic messages, electronically encoded video, electronically encoded audio, etc., and cannot detect, via the NLP software module executed by the one or more processors upon a transcription, that a degree of semantic similarity between an initial statement and remainder speech content does not satisfy an admissibility condition, among other features and functions set forth herein).

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "one of", without a more limiting modifier such as "only one of", and when applied herein to two or more subsequently defined options such as "one of A and B" should be construed to mean an existence of any one of the options in the list alone (e.g., A alone or B alone) or any combination of two or more of the options in the list (e.g., A and B together).

A device or structure that is "configured" in a certain way is configured in at least that way, but may also be configured in ways that are not listed.

The terms "coupled", "coupling" or "connected" as used herein can have several different meanings depending on the context in which these terms are used. For example, the terms coupled, coupling, or connected can have a mechanical or electrical connotation. For example, as used herein, the terms coupled, coupling, or connected can indicate that two elements or devices are directly connected to one another or connected to one another through intermediate elements or devices via an electrical element, electrical signal or a mechanical element depending on the particular context.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Any suitable computer-usable or computer readable medium may be utilized. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. In the context of this document, a computer-usable or computer-readable medium may be any medium that can contain, store, communicate, propagate, or transport the program for use by or in connection with the instruction execution system, apparatus, or device.

Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation. For example, computer program code for carrying out operations of various example embodiments may be written in an object oriented programming language such as Java, Smalltalk, C++, Python, or the like. However, the computer program code for carrying out operations of various example embodiments may also be written in conventional procedural programming languages, such as the "C" programming language or similar programming languages. The program code may execute entirely on a computer, partly on the computer, as a stand-alone software package, partly on the computer and partly on a remote computer or server or entirely on the remote computer or server. In the latter scenario, the remote computer or server may be connected to the computer through a local area network (LAN) or a wide area network (WAN), or the connection may be made to an external computer (for example, through the Internet using an Internet Service Provider).

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method comprising:
   receiving audio data captured by one or more microphones of a public safety portable radio at a crime scene, wherein the audio data comprises a first statement uttered by a first person and a second statement uttered by a second person;
   detecting, via a speaker-diarization software module executed by one or more processors upon the audio data, that the first person uttered the first statement and the second person subsequently uttered the second statement;
   detecting, using an NLP processing module, that the first statement includes an utterance indicative of predetermined criminal elements known to be associated with a crime;
   capturing a voiceprint data of the first statement, in response to the utterance indicative of predetermined criminal elements;
   detecting, using NLP processing, that the second statement is a Miranda statement, thereby identifying the second person as an officer;
   receiving additional audio data captured by the one or more microphones after the Miranda statement is made by the officer, wherein the additional audio data comprises additional remainder speech content;
   capturing a voiceprint data of the remainder speech content;
   comparing the captured voiceprint data of the remainder speech content to the voiceprint data associated with the first statement made by the first person to determine a voiceprint match;
   in response to the voiceprint match, determining that the first person is a suspect and that the remainder speech content is a post-Miranda statement uttered by the suspect;
   generating, via a voice-transcription software module executed by the one or more processors upon the audio data, a transcription of the pre-Miranda statement, the Miranda statement, and post-Miranda statement, the post-Miranda statement containing the remainder speech content that was uttered by the suspect after the Miranda-statement was uttered by the officer;
   detecting, via the NLP software module executed by the one or more processors upon the transcription, that a degree of semantic similarity between the pre-Miranda statement and the post-Miranda statement does not satisfy an admissibility condition for the crime;
   presenting, via a user interface software module, controlling a user interface electronic display of the public safety portable radio, an indication that the suspect did not repeat the pre-Miranda statement in the post-Miranda statement;
   generating, via the NLP software module executed by the one or more processors upon the transcription, a list of transcribed pre-Miranda statements identifying the elements of the crime that need to be repeated by the suspect and displaying the list on the user interface electronic display of the public safety portable radio;
   generating, via the NLP software module executed by the one or more processors upon the transcription, a question to induce the suspect to repeat the pre-Miranda statement containing the criminal elements associated with the crime and listed on the list;
   presenting the question via the user interface software module, to the user interface electronic display of the public safety portable radio; and
   presenting the question via the user interface software module, to the user interface electronic display.

2. The method of claim 1, further comprising:
   capturing, via the one or more microphones, an additional statement uttered by the suspect in response to the question;
   generating, via the voice-transcription software module executed by the one or more processors upon the additional statement, an additional transcription of the additional statement;
   determining, via the NLP software module executed by the one or more processors upon the additional transcription, an additional degree of similarity between the additional statement and the pre-Miranda statement made by the suspect; and
   presenting an indication of the additional degree of similarity, via the user interface software module, to the user interface electronic display.

3. The method of claim 1, wherein:
   the one or more processors, the speaker-diarization software module, the voice-transcription software module, the NLP software module, and the user interface software module reside on a server; and
   the user interface electronic display resides on the public safety portable radio in communication with the server over a public safety network.

4. The method of claim 1, wherein detecting that the second statement comprises the Miranda statement further comprises:
- determining, via the NLP software module executed by the one or more processors upon the transcription, that the suspect has waived his/her right to refrain from speaking; and
- presenting an indication confirming the waived right, via the user interface software module, to the user interface electronic display.

5. The method of claim 1 further comprising:
- capturing an audio response uttered by the suspect in response to the question;
- determining a degree of semantic similarity between the first statement and the response to the question;
- comparing the degree of similarity to a predetermined semantic similarity threshold; and
- generating additional questions, via the NLP software module executed by the one or more processors upon the transcription, until a the degree of semantic similarity between the first statement and the response to the question does meet or exceed the predetermined semantic similarity threshold.

6. The method of claim 5, further comprising presenting on the user interface electronic display:
- a list of transcribed statements made by the suspect prior to the Miranda statement made by the officer;
- a list of questions generated by the NLP software module to prompt a re-statement of at least one of the statements from the list of transcribed statements;
- a user interface playback option to selectively play back audio associated with the list of transcribed statements; and
- an image of the suspect associated with the list of statements.

7. The method of claim 6, further comprising:
presenting on the user interface electronic display:
a list of transcribed responses to the questions;
an indication of semantic similarity confidence level between the pre-Miranda statement and each response; and
additional questions when the semantic similarity confidence level has not reached a predetermined desired confidence level threshold.

8. The method of claim 7, further comprising:
a portion of text of the first statement does not meet the predetermined semantic similarity threshold with at least the remainder of speech content and/or the response to the one or more questions.

* * * * *